(12) United States Patent
Chess

(10) Patent No.: US 6,684,148 B2
(45) Date of Patent: Jan. 27, 2004

(54) TRANSMISSION CONTROL SYSTEM

(75) Inventor: Robert Lee Chess, Troutdale, OR (US)

(73) Assignee: NACCO Materials Handling Group, Inc., Fairview, OR (US)

( * ) Notice: Subject to any disclaimer, the term of this patent is extended or adjusted under 35 U.S.C. 154(b) by 0 days.

(21) Appl. No.: 10/209,444

(22) Filed: Jul. 30, 2002

(65) Prior Publication Data

US 2003/0233186 A1 Dec. 18, 2003

Related U.S. Application Data

(60) Provisional application No. 60/388,533, filed on Jun. 12, 2002.

(51) Int. Cl.$^7$ .............................................. G06F 7/00
(52) U.S. Cl. .............................. 701/95; 701/67; 701/70
(58) Field of Search ........................... 701/67, 70, 78, 701/93, 95, 121; 303/113.2, 138; 180/197

(56) References Cited

U.S. PATENT DOCUMENTS 4,144,863 A * 3/1979 Abdoo .................... 123/198 F
4,838,622 A * 6/1989 Kircher et al. ............ 303/113.2
6,186,029 B1   2/2001 McQuinn
2002/0107111 A1 * 8/2002 Murakami ................. 477/210

FOREIGN PATENT DOCUMENTS

EP          1093986 A2    4/2001
JP          2002-235846  * 8/2002

* cited by examiner

Primary Examiner—Richard M. Camby
(74) Attorney, Agent, or Firm—Marger Johnson & McCollom, PC

(57) ABSTRACT

A transmission system includes a Central Processing Unit (CPU) that controls truck braking energy by sharing energy dissipation between clutch packs. The CPU reduces engine speed and then slips the two clutch packs at the same time to maintain a reduced turbine speed for a torque converter. In another aspect of the transmission system, energy loss is reduced during high draw bar pull conditions. The engine speed is modulated to trim energy peaks at low pushing or pulling speeds. An additional transmission gear reduction restores the lost pushing or pulling forces while generating less heat in the torque converter.

45 Claims, 9 Drawing Sheets

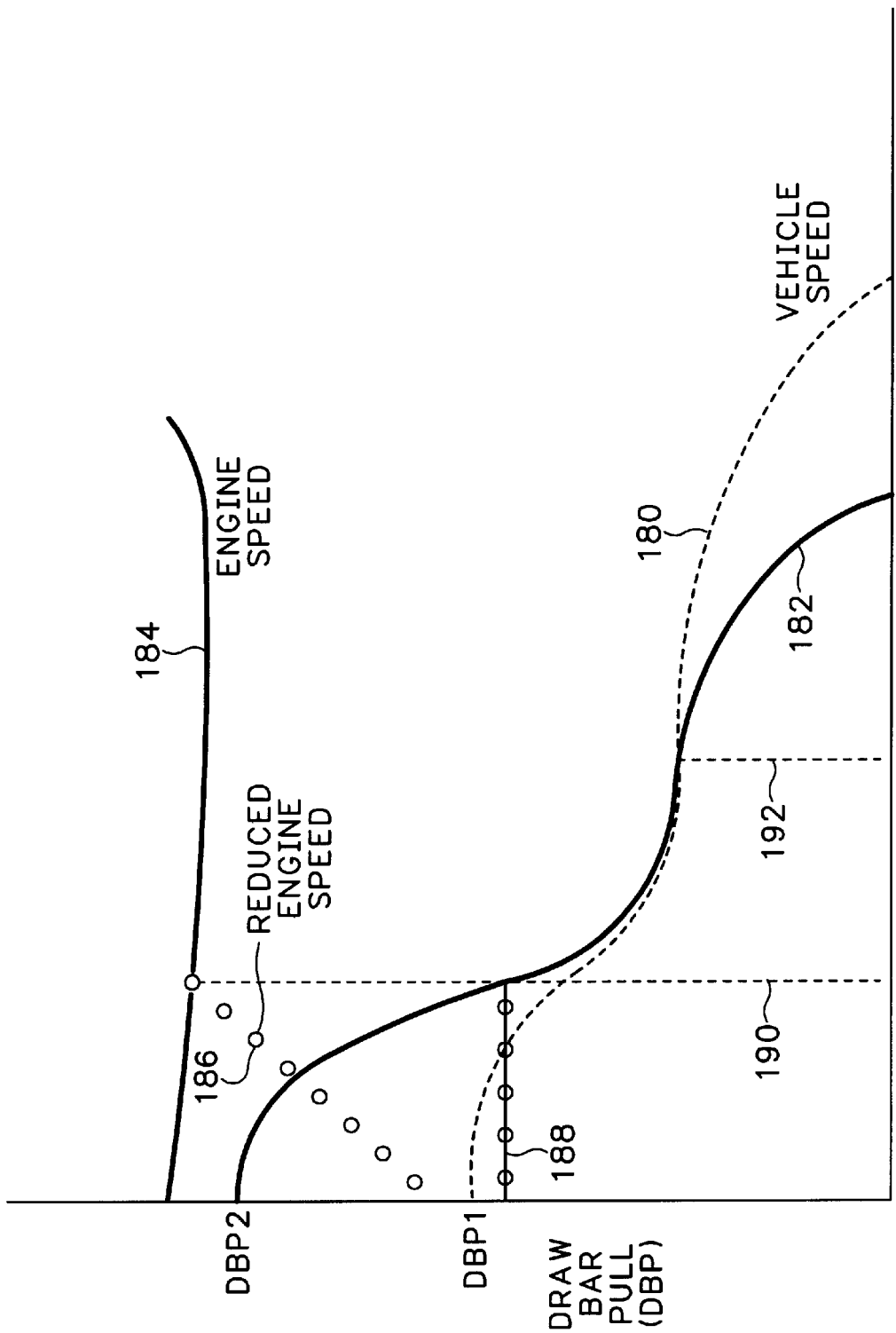

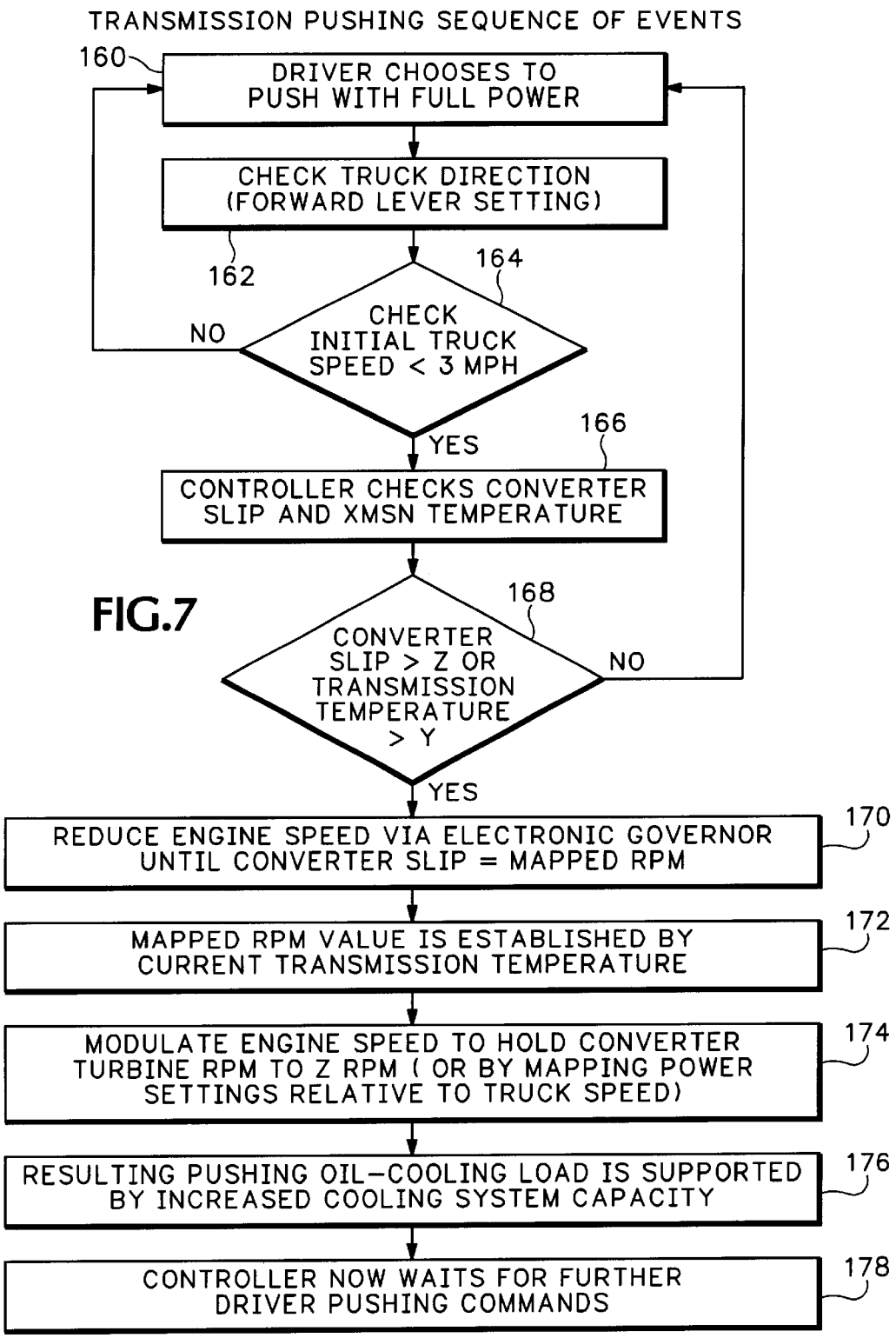

TRANSMISSION CONTROL SYSTEM

This application claims the benefit of provisional application Ser. No. 60/388,533 filed Jun. 12, 2002.

BACKGROUND

Clutch pack braking is a well-established method of braking vehicles and refers to using clutch packs in the transmission system to slow or brake a vehicle. Clutch pack braking is usually performed by slipping one clutch pack while locking the other clutch pack. This technique concentrates all of the energy in the slipping pack, or if both packs are slipped, can produce unpredictable slipping in both clutch packs. Also, if part throttle braking is attempted, clutch pack braking can stall the vehicle engine by turning the torque converter turbine in the transmission system backwards and overloading the engine. Thus a vehicle operator currently has to use a brake pedal to stop a vehicle at higher speeds.

Energy is wasted in power shift transmissions due to large torque converter slippage at low truck speeds. This usually happens when the vehicle is generating maximum pushing forces. This energy loss can be up to 100 percent of engine power.

The present invention addresses this and other problems associated with the prior art.

SUMMARY OF THE INVENTION

A transmission system includes a Central Processing Unit (CPU) that controls the turbine speed of a torque converter by reducing engine speed and then slipping two clutch packs at the same time. The CPU reduces the engine speed to idle, regardless of the specific throttle request made by the vehicle operator. The CPU then controls clutch pack activation pressure to obtain the optimum split of energy between the two clutch packs during braking. By sharing braking energy between the two clutch packs, conventional clutch packs can be used for high-speed vehicle direction reversals and high-speed vehicle braking.

In another aspect of the transmission system, energy loss is reduced during high Draw Bar Pull conditions. The engine speed is modulated to trim energy peaks at low speeds. An additional transmission gear reduction restores the lost pushing forces while generating less heat in the torque converter. A radiator air-to-oil cooling system extracts the extra heat generated when the vehicle is pushing loads and extends the normal allowable pushing time for the vehicle.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 6 is a diagram showing how a vehicle is controlled during high draw bar pull condition.

FIG. 7 is a flow diagram showing in further detail how a vehicle operates during a high draw bar pull operation.

DETAILED DESCRIPTION

Figure 1A:
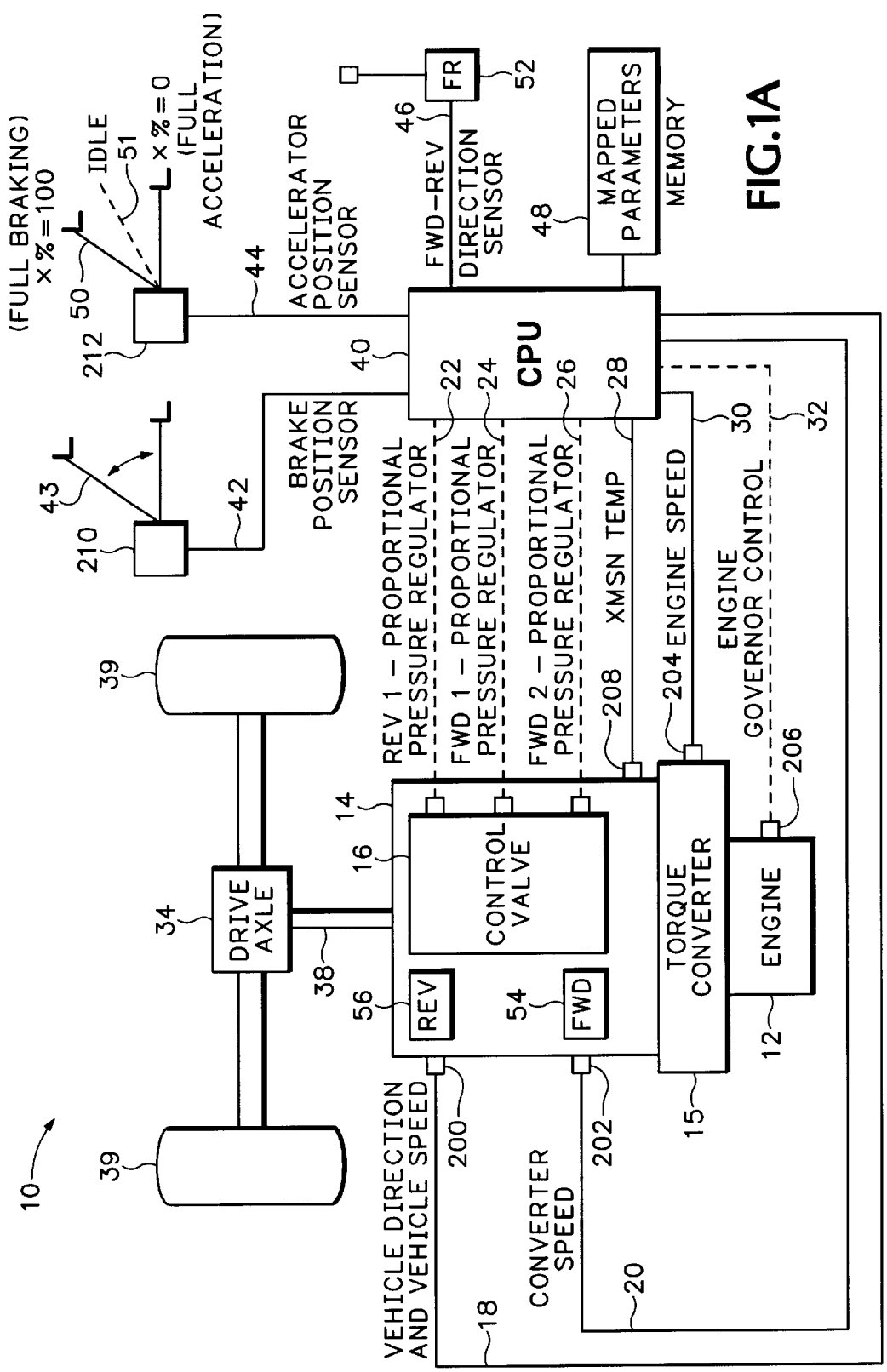
FIG. 1A is a schematic diagram of a transmission system.

FIG. 1A shows portions of a vehicle 10 including a power shift transmission 14 connected to an engine 12 by a hydraulic torque converter 15. An output shaft 38 of the transmission 14 is connected to a drive axle 34 that drives wheels 39. In one example, the power shift transmission 14 is used in a fork lift truck. However, the transmission 14 can also be used in other types of vehicles.

A Central Processing Unit (CPU) 40 controls the activation of a forward clutch pack (FWD) 54 and a reverse clutch pack (REV) 56 in the transmission 14 according to different vehicle parameters. A control valve 16 in the transmission 14 controls fluid pressure that activates the two clutch packs 54 and 56.

The CPU 40 receives a vehicle speed and direction signal 18 from a vehicle speed sensor 200 indicating the rotational speed and direction of the axle 38. A converter speed signal 20 is generated from a torque converter speed sensor 202 and indicates the rotational speed for an output shaft 17 (FIG. 1B) of the torque converter 15. An engine speed signal 30 is generated from an engine speed sensor 204 and indicates how fast an output shaft 13 (FIG. 1B) of the engine 12 is rotating. An engine governor control signal 32 controls a throttle valve 206 that controls the speed of engine 12. A transmission temperature signal 28 is generated from a temperature sensor 208 and indicates the temperature of the transmission fluid in the torque converter 15 or transmission 14.

The CPU 40 receives a brake pedal position signal 42 from a brake sensor 210 on brake pedal 43. An accelerator pedal position signal 44 is received from a position sensor 212 on accelerator pedal 50. The accelerator pedal position can alternatively refer to a throttle value, acceleration value, or deceleration value. A forward-reverse direction signal 46 is generated by a direction lever or pedal 52 and indicates a forward or backward direction the vehicle operator selects for the vehicle 10. An internal or external memory 48 contains mapped parameters identifying clutch pack pressure valves and other control parameters used for performing different braking operations.

Figure 1B:
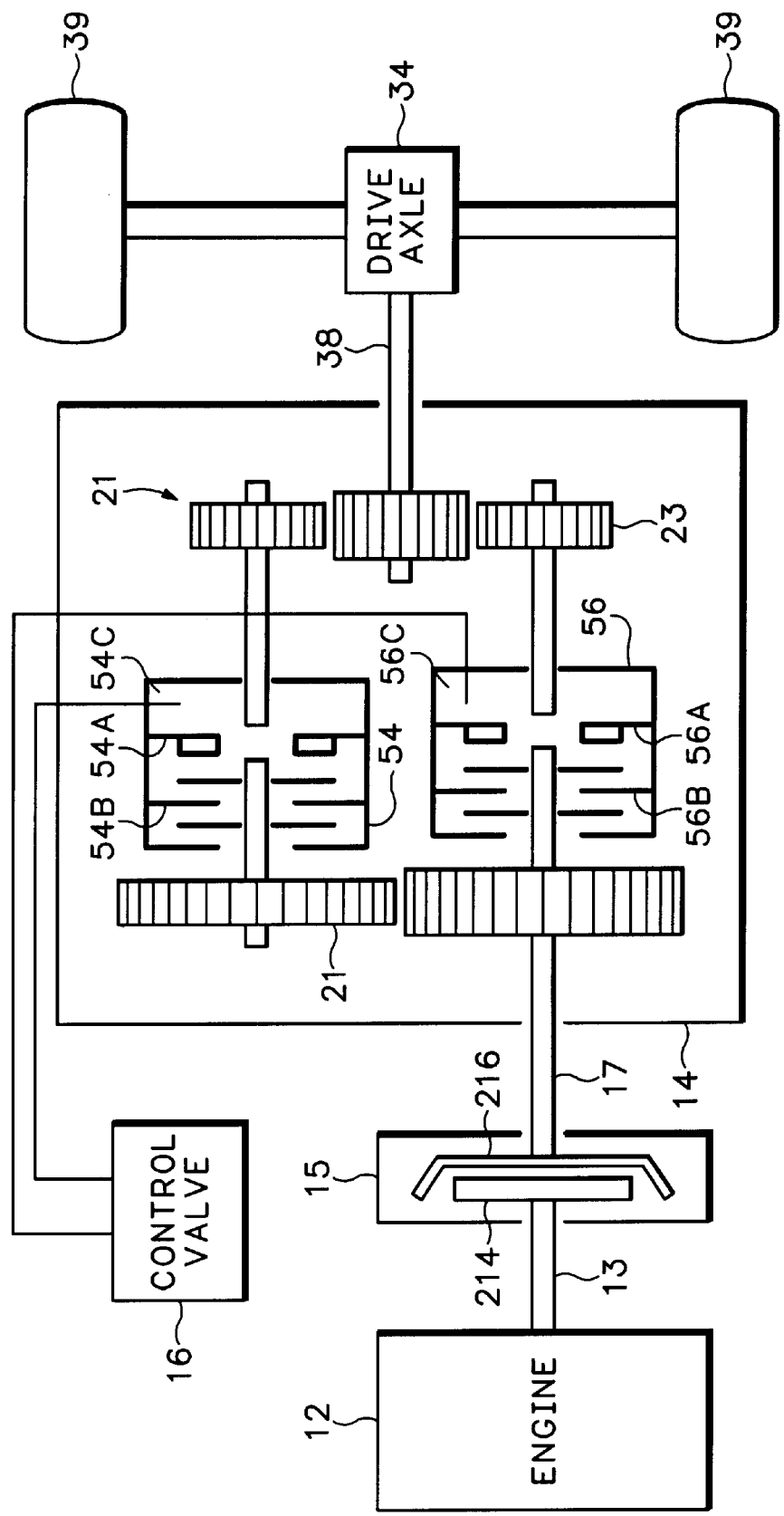
FIG. 1B is a more detailed schematic diagram of a single Speed powershift (PS) transmission system.

FIG. 1B is a more detailed schematic diagram of a single speed power shift transmission. The torque converter 15 includes an impeller pump 214 and a turbine 216. A shaft 13 extends from the impeller pump 214 and is coupled to the crankshaft of engine 12. A shaft 17 extends from the turbine 216 and is coupled to the input of transmission 14. The torque converter 15 continuously varies the ratio of the speed of the output shaft 17 to the speed of the input shaft 13 in accordance with the load on the output shaft 17.

The forward clutch 54 and the reverse clutch 56 each selectively engages and disengages the input shaft 17 with the output shaft 38 through the forward gears 21 and reverse gears 23. The engaging force of the clutches 54 and 56 is controlled by changing the oil pressure in oil chambers 54C and 56C, respectively. The oil pressures are controlled by the control value 16 which is controlled by the CPU 40 (FIG. 1A). The clutches 54 and 56 in one embodiment are multiple disk hydraulic wet clutches.

When the clutch pressures are both zero, the clutches 54 and 56 disconnect the output shaft 38 from the input shaft 17. When the clutch pressure for either of the clutch packs is at a maximum pressure, the corresponding clutch pack maximizes the engaging force (locking). When the clutch pack pressure is between zero and the maximum value, the corresponding clutch pack is partially engaged. The partially engaged condition is referred to as clutch pack slipping. A FWD-1 signal 24 in FIG. 1A controls the oil pressure in the forward low clutch pack 54. A REV-1 signal 22 in FIG. 1A controls the oil pressure in the REV clutch pack 56.

When the vehicle 10 is moving in a forward direction at a high speed in forward gear 21, the forward clutch 54 is partially engaged (not locked) and reverse clutch 56 and forward clutch 54 operate as a hydraulic brake. When the vehicle is moving backwards in reverse gear 23, the reverse clutch 56 is partially engaged (not locked) and the forward clutch 54 and reverse clutch 56 function as a hydraulic brake.

Figure 1C:
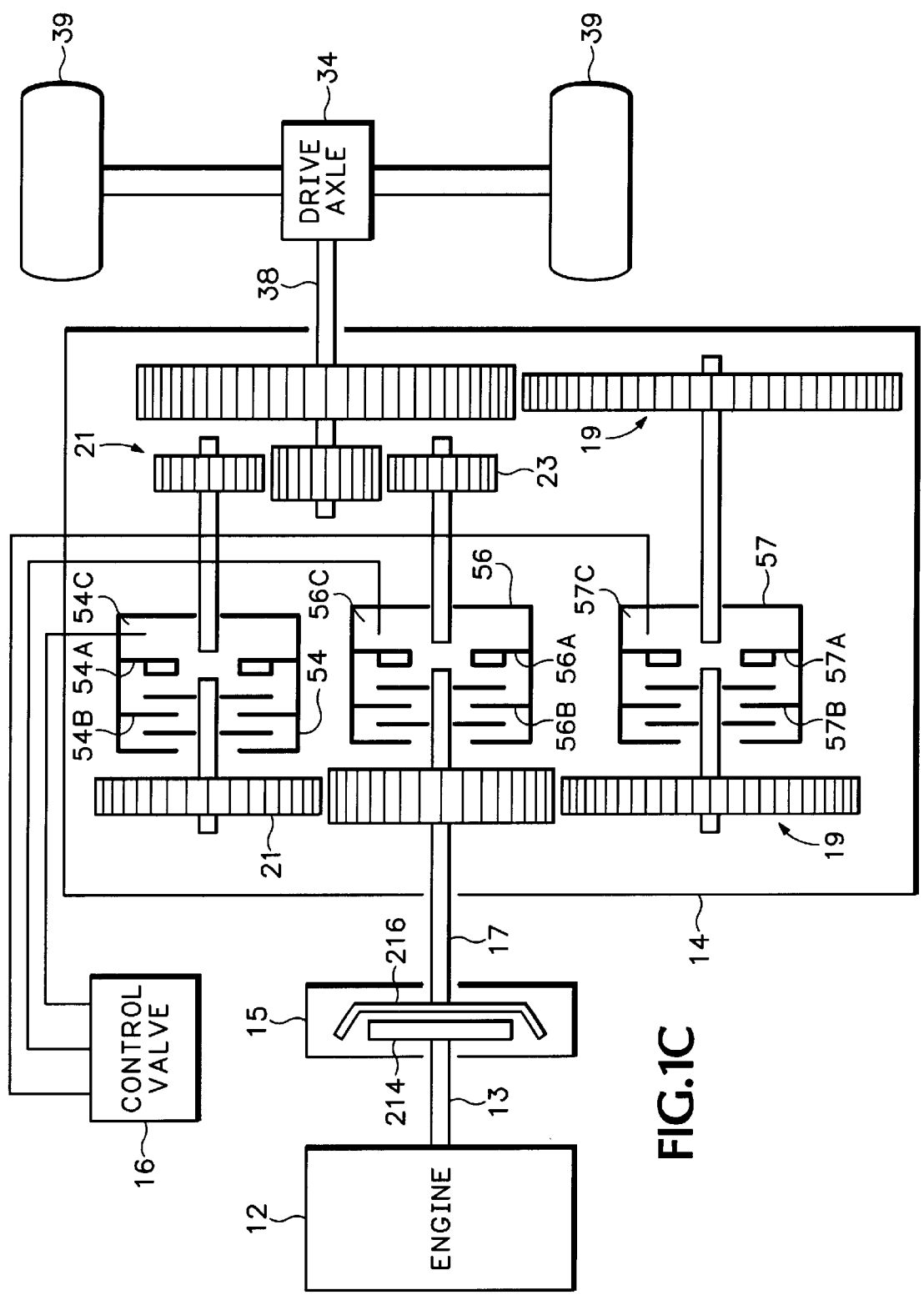
FIG. 1C is a more detailed schematic diagram of a two/one Speed PS transmission system.

A two speed PS transmission is shown in FIG. 1C and includes two forward gears 19 and 21 and one reverse gear 23. A second forward multiple disk hydraulic wet clutch 57 selectively engages and disengages the input shaft 17 with the output shaft 38 through high forward gear 19.

When the vehicle 10 is moving in a forward direction at a high speed in high gear 19, the high forward clutch 57 is partially engaged (not locked) and the low forward clutch 54 and high forward clutch 57 operate as a hydraulic brake. When the vehicle 10 is moving in a forward direction at a slower speed, the forward low clutch 54 is partially engaged (not locked) and the reverse clutch 56 and low forward clutch 54 function as a hydraulic brake. When the vehicle is moving backwards, the reverse clutch 56 is engaged (not locked) and the low forward clutch 54 and reverse clutch 56 function as a hydraulic brake.

The single speed PS transmission shown in FIG. 1B, the multi-speed PS transmission shown in FIG. 1C, or any other combination of gears, can be used with the transmission control system shown in FIG. 1A for performing the braking and high draw bar pull operations described below.

Clutch Pack Energy Sharing During Power Reversals

Figure 2:
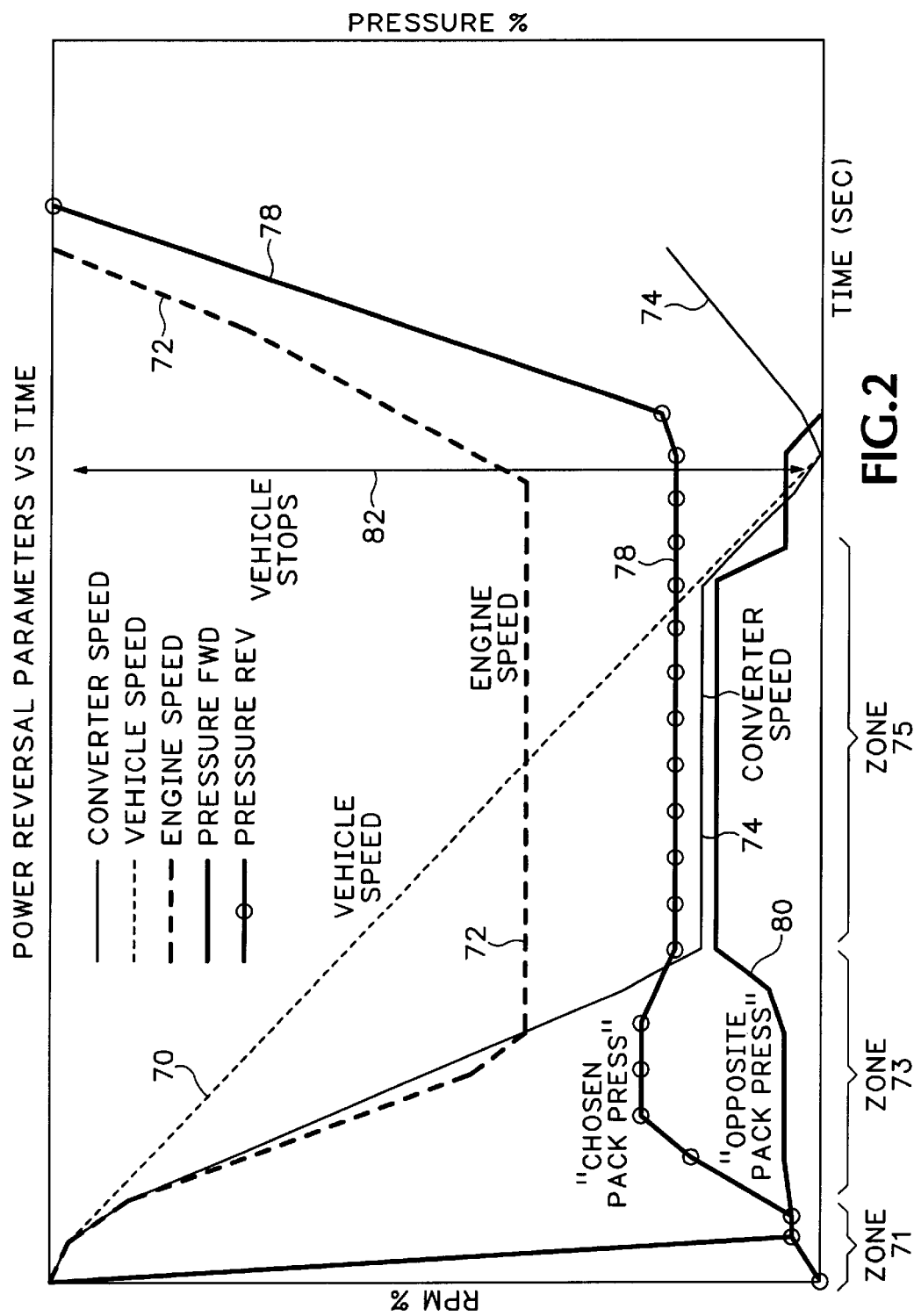
FIG. 2 is a diagram showing how the transmission system in FIG. 1 performs power reversal.

A power reversal refers to changing the direction of a vehicle in motion from one direction to an opposite direction. Referring to FIG. 2, a line 70 represents the rotational speed of the output shaft 38 from the transmission 14. This is proportional to the speed of vehicle 10. Line 72 represents the rotational speed of shaft 13 output from engine 12. Line 74 represents the rotational speed of the output shaft 17 of torque converter 15.

The power reversal is described below with regards to the single speed transmission shown in FIG. 1B. But as described above, the power reversal operation can use the multiple speed transmission shown in FIG. 1C or any other multi-speed transmission system.

Line 78 represents an amount of oil pressure applied to one of the clutch packs 54 or 56 associated with the chosen direction of the vehicle. For example, if the vehicle is currently traveling in a forward direction, and the vehicle operator chooses to reverse the vehicle in the opposite direction, then the REV clutch pack 56 will be the chosen pack represented by line 78. Alternatively, if the vehicle 10 is currently traveling in a reverse direction and the vehicle operator chooses to reverse the vehicle to move in the forward direction, then the FWD clutch pack 54 is the chosen clutch pack represented by line 78. The chosen pack is alternatively referred to as the braking pack. Line 80 represents the pressure applied by the other clutch pack 54 or 56 that operates in the rotational direction opposite to the chosen pack (opposite pack).

The vehicle operator initiates a power reversal by switching direction lever or pedal 52 (FIG. 1A) to a position associated with an opposite direction of current vehicle travel. When the power reversal request is initiated, the CPU 40 sets the engine speed 72 to idle by controlling the engine governor signal 32 (FIG. 1A). The chosen clutch pack pressure 78 is then applied to slip the chosen pack.

The initial clutch pack pressure 78 is selected by CPU 40 according to the position of accelerator pedal 50. For example, when the accelerator pedal 50 is fully depressed (maximum vehicle speed), a higher initial pressure 78 may be applied to the chosen pack. When the position of pedal 50 is only slightly depressed a lower pressure 78 may be initially applied to the chosen pack.

The chosen pack pressure 78 is initially increased to a high pressure value in zone 73 to quickly bring down the converter speed 74. The chosen pack pressure 78 is then maintained at a relatively constant value in zone 75.

The opposite pack pressure 80 is first reduced in zone 71 for the clutch pack associated with the current direction of vehicle travel (prior to reversal). Opposite pack pressure 80 is then increased in zone 73. The opposite pack pressure 80 is electronically modulated in zone 75 to hold the torque converter turbine speed 74 at a relatively constant low value.

Electronic modulation refers to the CPU 40 repeatedly measuring the torque converter speed 74 and then either increasing or decreasing the opposite pack pressure 80 to keep the torque converter speed 74 at the relatively constant low value in zone 75. Alternatively, the pack pressures 78 and 80 can be set to values determined from empirical test data previously derived during various dynamic vehicle conditions. The pack pressure values are stored in memory 48.

Both the engine speed 72 and the torque converter speed 74 are reduced by CPU 40 to low values in zone 75. The engine speed 72 is reduced to idle and the torque converter speed 74 (speed of converter output shaft 17) is reduced to a value below the engine idle speed. In one example, the engine idle speed is around 40% of engine maximum rpm and the converter speed 78 in zone 75 is around 20% of maximum engine rpm.

The low engine speed 72 in combination with the low torque converter output speed 74 in zone 75 allow both clutch packs 54 and 56 to be slipped at pressures that split the braking energy.

As mentioned above, the actual pressures applied to the two clutch packs 54 and 56 can be selected by the CPU 40 according to previously determined and stored mapped parameters stored in memory 48 (FIG. 1A).

Alternatively, the CPU 40 can use a Proportional Integral and Differential (PID) closed loop. In the closed loop scheme, the CPU 40 is loaded with a preprogrammed target converter speed 74. The CPU 40 then dynamically and in real time varies the opposite clutch pack pressure 80 to obtain and then maintain the target converter speed 74 in zone 75. For example, when the converter speed 74 drops below the value shown in zone 75, the CPU 40 may increase the opposite pack pressure 80. Conversely, if the converter speed 74 rises above the value shown in zone 75, the CPU 40 may decrease the opposite pack pressure 80.

Figure 3:
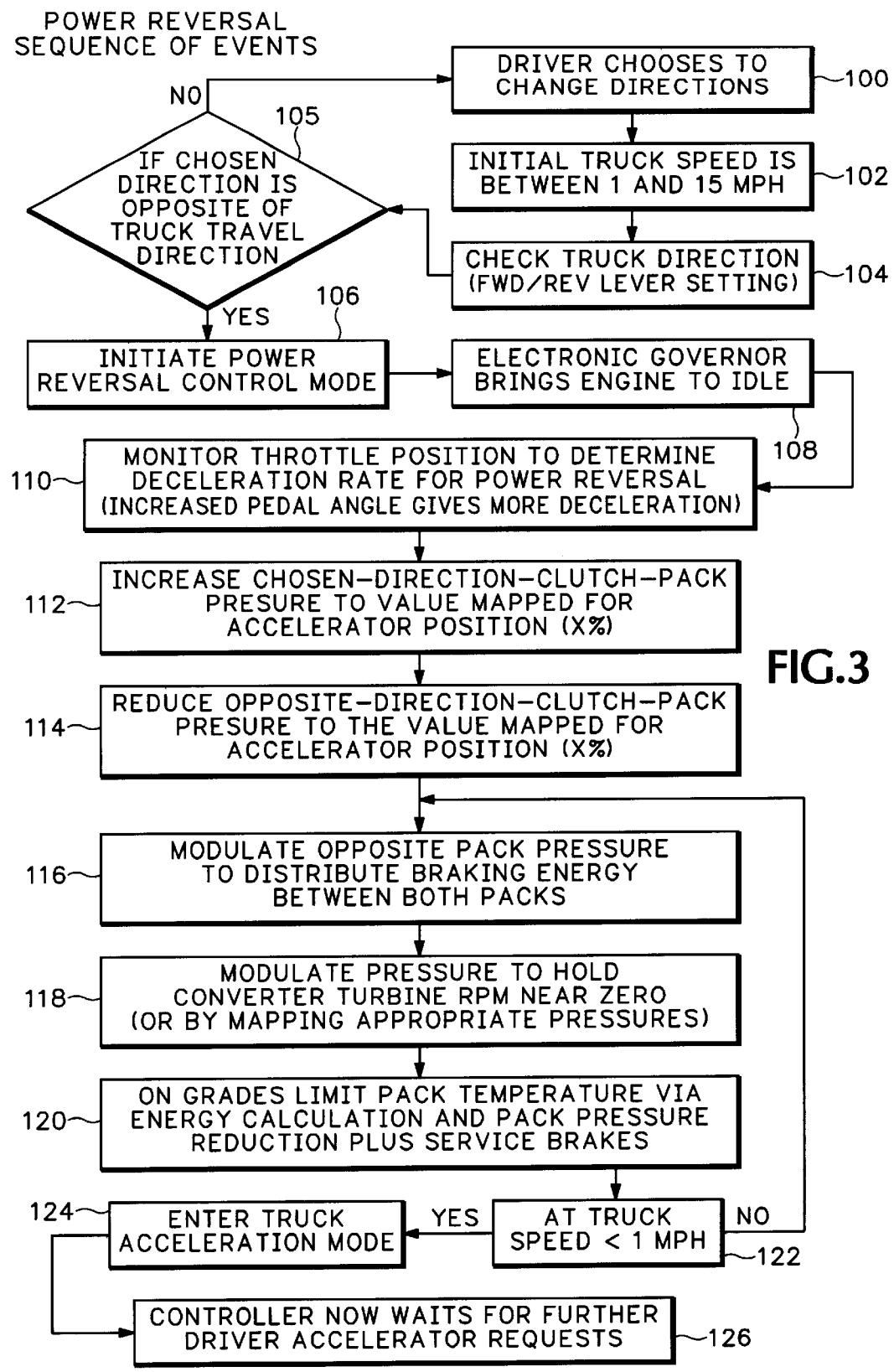
FIG. 3 is a flow diagram showing in further detail how the transmission system performs a power reversal.

FIG. 3 shows in more detail how a power reversal is performed with the transmission system shown in FIGS. 1A, 1B or 1C. Referring to FIGS. 1–3, the vehicle operator chooses to change direction of the vehicle in block 100. This is indicated to the CPU 40 in one example when the vehicle operator moves the forward-reverse switch 52 (FIG. 1A). The direction change can be requested at any vehicle speed. The CPU 40 checks the initial vehicle speed and direction in block 102. If the vehicle speed is below some small value, such as below 1 Mile Per Hour (mph), control moves down to block 122 which is described below.

If the vehicle speed is above a predetermined value, the CPU compares the direction selected by the operator with the current vehicle travel direction in block 104. This can be done by comparing the direction sensor signal 46 in FIG. 1A with the speed and direction signal 18. If the current travel direction of the vehicle is the same as the operator selected direction in block 105, the CPU 40 jumps back to block 100. If the direction chosen by the operator is opposite to the current vehicle travel direction, the CPU 40 initiates a power reversal control mode in block 106.

In the power reversal control mode, the electronic governor control signal 32 in FIG. 1A is used by the CPU in block 108 to reduce the engine speed to idle. The CPU 40 then monitors the throttle position for the accelerator pedal 50 (x%) in block 110. The throttle position x% is used by the CPU 40 to determine the deceleration rate for the power reversal. The more the accelerator pedal 50 is depressed (higher vehicle speed), the faster the CPU 40 needs to decelerate the vehicle. Accordingly, the CPU 40 may apply a larger chosen pack pressure 78 to the chosen clutch pack. Conversely, the less depression of accelerator pedal 50 (slower vehicle speed), the slower the CPU 40 needs to decelerate the vehicle.

Pressure for the chosen direction pack is increased to the mapped value associated with the identified accelerator position (x%) in block 112. In block 114, the CPU 40 reduces the pressure for the opposite clutch pack according to the mapped values associated with the accelerator pedal position (x%). This is shown in FIG. 2 by the pack pressures 78 and 80 in time zones 71 and 73.

The CPU 40 in blocks 116 and 118 shares vehicle-braking energy between clutch packs 54 and 56 by modulating the opposite pack pressure 80 in time zone 75. The torque converter turbine speed 74 is less than the vehicle speed 70 in zone 75. Thus, slipping the opposite clutch pack (current direction of vehicle travel) in zone 75 contributes to vehicle braking while at the same time preventing the chosen pack (opposite to current direction of vehicle travel) from stalling the engine.

The turbine speed 74 is kept near zero in zone 75 until the vehicle has nearly stopped at time 82. The temperature of the clutch packs 54 and 56 may be limited on grades in block 120. The temperature is limited by using an energy calculation to determine when the CPU should reduce clutch pack pressure and allow the driver to take control with the service brake (not shown).

The CPU 40 enters an acceleration mode in block 124 when the vehicle speed 70 falls below 1 mph in block 122. The reverse direction acceleration mode is represented by the lines to the right of time line 82 in FIG. 2. In the acceleration mode, the CPU 40 reduces the opposite clutch pack pressure 80 according to mapped values. The CPU 40 also increases the chosen pack pressure 78. The engine speed 72 is increased according to the detected position of accelerator pedal 50 and according to mapped speed increase rates. The CPU 40 then waits for a new acceleration or deceleration request from the vehicle operator in block 126.

Clutch Pack Energy Sharing During Accelerator Braking

Clutch pack energy sharing during accelerator braking refers to distributing stopping energy between the two clutch packs while stopping a vehicle. In one example, accelerator braking uses the two clutch packs to automatically stop the vehicle when the vehicle operator lets off on the accelerator pedal 50 (FIG. 1).

Figure 4:
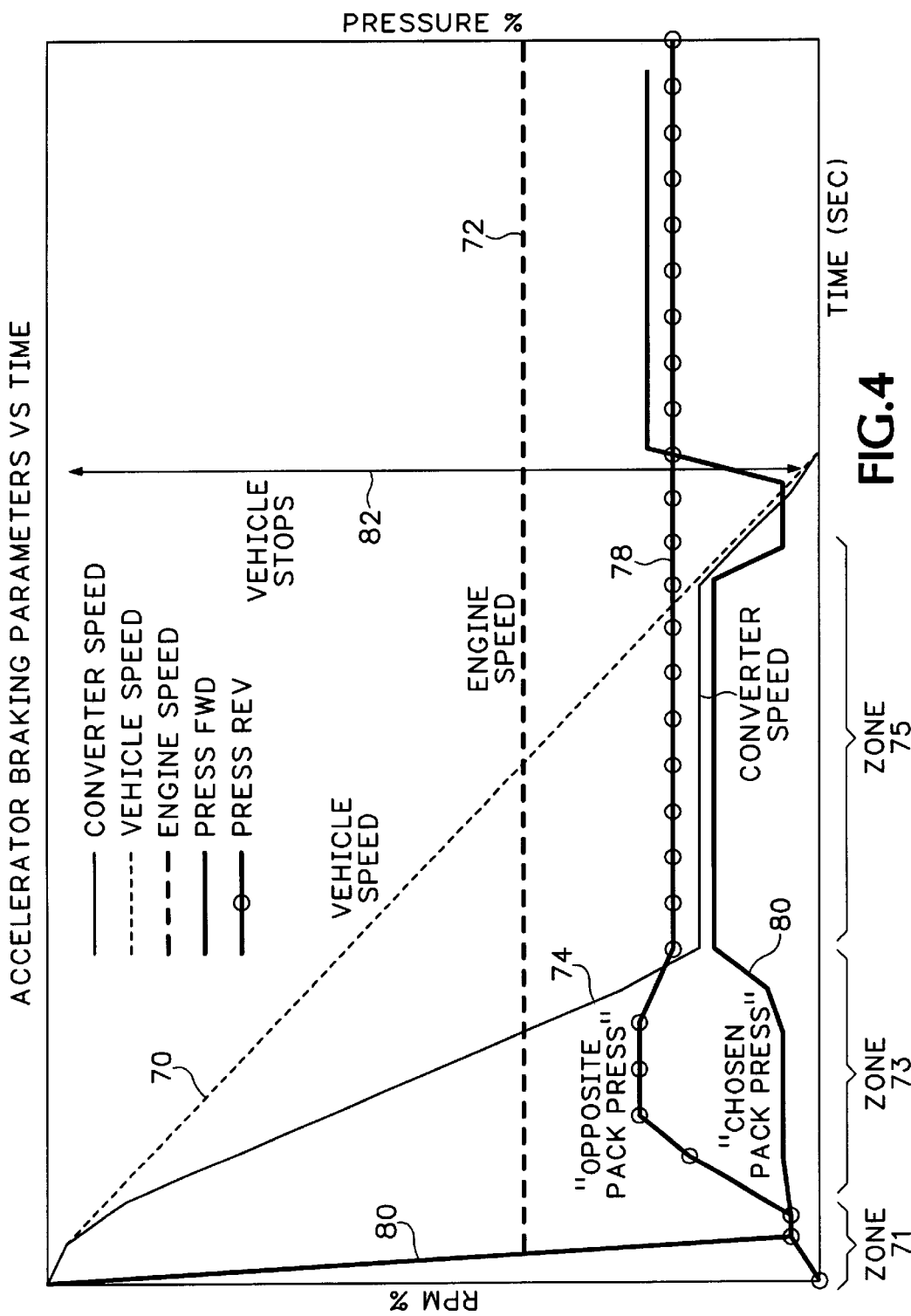
FIG. 4 is a diagram showing how the transmission system in FIG. 1 performs accelerator braking.

FIG. 4 shows how the CPU 40 controls accelerator braking. The control scheme in FIG. 4 is similar to the control scheme shown in FIG. 2 for the power reversal except for a few differences. Accelerator braking does not automatically accelerate the vehicle in the opposite direction after stopping the vehicle. Instead, accelerator braking transitions into a holding state after the truck speed 70 approaches zero at time 82. Another difference is that releasing the accelerator pedal more in an upward position increases the level of braking after the engine is reduced to an idle point.

The opposite pack pressure 78 in FIG. 4 refers to the clutch pack associated with the direction opposite to the current travel direction of the vehicle. The chosen pack pressure 80 in FIG. 4 refers to the clutch pack associated with the current travel direction of the vehicle. For example, if the vehicle is traveling in the forward direction, the chosen pack pressure 80 is applied to the FWD clutch pack 54 and the opposite pack pressure 78 is applied to the REV clutch pack 56. If the vehicle is currently traveling in reverse, the chosen clutch pack pressure 80 is applied to the REV clutch pack 56 and the opposite clutch pack pressure 78 is applied to the FWD clutch pack 54.

Again, accelerator braking is described in terms of the single speed transmission shown in FIG. 1B. However, accelerator braking can also use a multi-speed transmission similar to that shown in FIG. 1C.

Referring to FIGS. 1 and 4, the vehicle operator slows the vehicle by bringing the engine speed 72 to idle. This is done in one example by the vehicle operator lifting up on the accelerator pedal 50 (FIG. 1A). The CPU 40 senses the driver reducing the engine speed to idle with the intent of slowing the vehicle. In one example, this is done by monitoring the position of accelerator pedal 50. If the operator lifts the accelerator pedal above an idle position, the CPU starts automatic accelerator braking. Of course, other types of devices can also be used and detected by the CPU 40.

The CPU 40 reduces the chosen pack pressure 80 in time zone 71. The pack pressures 78 and 80 are then applied at specific valves according to the detected position of the accelerator pedal 50. The pack pressures 78 and 80 may vary from low pressure settings when the accelerator pedal 50 is moved slightly above an idle engine position (slow braking) to higher pressure settings when the accelerator pedal 50 is released to the full up position (full braking).

For example, the vehicle operator may lift the accelerator pedal 50 two thirds of the way up from a fully depressed acceleration position. This is represented in FIG. 1A by the accelerator pedal 50 moving from position x%=0 to idle position 51. The CPU 40 may use relatively lower pressure settings 78 and 80 in FIG. 4 for pedal positions slightly above idle position 51. Alternatively, the vehicle operator may initiate full braking by lifting completely off on the accelerator pedal 50 (x%=100). In this situation, the CPU 40 may use higher clutch pack pressures 78 and 80 to stop the vehicle more quickly.

After the converter speed 74 is brought down to a near zero speed in zone 75, the chosen pack pressure 80 in FIG.

4 is PID modulated by the CPU 40 to hold the torque converter speed 74 at a substantially constant low value. Alternately, the same effect can be approximated by using empirical values to set pack pressures 78 and 80.

When the engine speed 72 is brought to idle and the torque converter speed 74 is modulated to a low value below the engine idle value 72 in zone 75, both clutch packs 54 and 56 are capable of being slipped for optimum brake energy-sharing.

It should be understood that either clutch pack 54 or 56 can be modulated in zone 75. For example, during the power reversal braking shown in FIG. 2, the chosen pack pressure 80 could be modulated to maintain the constant low turbine speed 74 in zone 75. Similarly, opposite pack pressure 78 in FIG. 4 may be modulated in zone 75 during accelerator braking. But, the preferred technique is to modulate the opposite pack pressure 80 for the power reversal in FIG. 2 and modulate the chosen pack pressure 80 for accelerator braking in FIG. 4.

Figure 5:
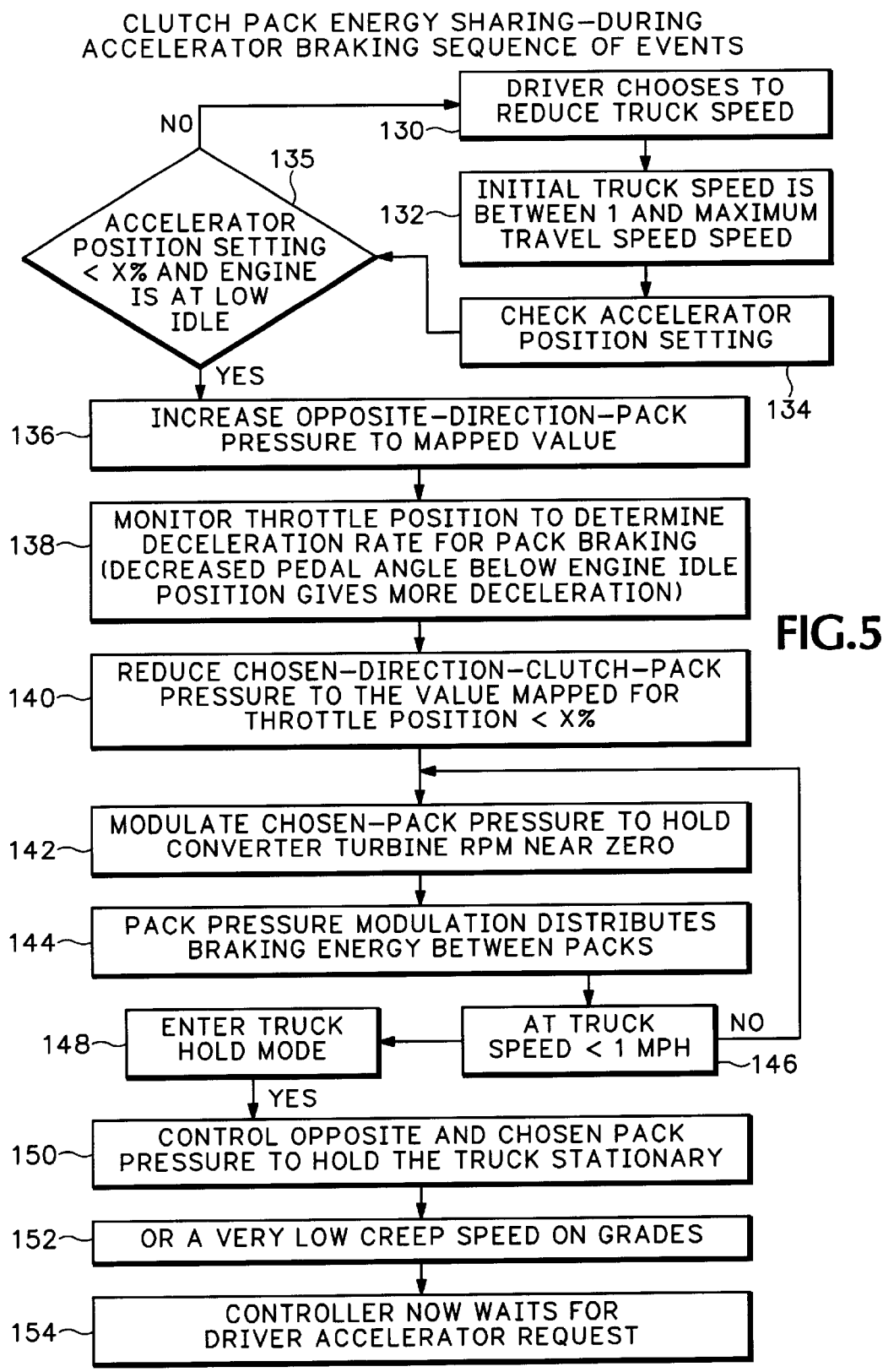
FIG. 5 is a flow diagram showing in more detail how the transmission system performs accelerator braking.

FIG. 5 shows in more detail how accelerator braking is performed. Referring to FIGS. 4 and 5, the CPU 40 goes into an accelerator braking mode when the vehicle operator lifts up on the accelerator pedal 50 more than some specific distance or angle (x%). If the vehicle operator lifts up on the accelerator pedal 50 some intermediate distance, the vehicle is placed in an idle mode. If the vehicle operator depresses the accelerator pedal down some distance lower than the idle position, the vehicle is accelerated.

The CPU 40 determines if the vehicle operator wants to reduce the truck speed in block 130 (braking mode). If the vehicle speed is less than some minimum value, such as 1 mph, the CPU jumps to block 146, which is described in more detail below. If the vehicle speed is equal to or above the minimum speed in block 132, the CPU 40 checks the accelerator pedal position in block 134. If the pedal position is not released some predetermined distance x% in block 135, for example, above idle position 51 in FIG. 1A, the CPU 40 returns to block 130 and the accelerator braking mode is not initiated.

If the vehicle operator lifts up on the accelerator pedal 50 more than the predetermined distance (x%), and the engine speed 72 is at a low idle value, the CPU 40 goes into the accelerator braking mode in block 136.

In the braking mode, the CPU increases the opposite pack pressure 78 in zones 71 and 73. The opposite pack pressure 78 is applied to the clutch pack associated with the direction opposite to the current traveling direction of the vehicle. The opposite pack pressure 78 is increased to a mapped value above the chosen pack pressure 80 in zone 73.

The CPU 40 monitors the position of the accelerator pedal 50 or other throttling means in block 138 to determine a deceleration rate for accelerator braking. If the pedal has a decreased angle below the idle position, the vehicle may be decelerated at a faster rate. If the pedal has an increased angle below the idle position, the vehicle may be decelerated at a slower rate.

The CPU 40 in block 140 reduces the chosen pack pressure 80 to a value mapped to the previously detected pedal position x% as shown in zone 71 in FIG. 4. The chosen pack pressure 80 is increased and then modulated in block 142 to hold the turbine speed 74 near zero for zone 75.

The converter speed 74 is kept near zero in zone 75 (FIG. 4) until the vehicle is nearly stopped in block 146. When the vehicle speed slows to less than 1 mph in block 146, the CPU 40 enters a hold mode in block 148. During the hold mode, the opposite pack pressure 78 and the chosen pack pressure 80 are controlled to hold the vehicle in a stationary position in block 150. This is shown by the opposite pack pressure 78 remaining at a constant value after vehicle stop time 82 and the chosen pack pressure 80 going to a value above opposite pack pressure 78 after stop time 82. The converter speed 78 remains at zero speed or a constant very low value after stop time 82.

If the vehicle is on a grade, the CPU 40 may allow the vehicle to creep at a very low speed in block 152. This notifies the vehicle operator that the vehicle parking break has not been activated. The CPU then waits for a new accelerator request from the vehicle operator, such as a move, change direction, inch, etc. in block 154.

Power reversal and accelerator braking distribute stopping energy to both clutch packs 54 and 56 by maintaining the converter turbine speed 74 at a low level during deceleration. This allows the vehicle to be quickly slowed and stopped using only the accelerator pedal 50 and conventional clutch packs. The vehicle can be stopped easier from higher speeds than currently possible with hydrodynamic transmissions (powershift transmissions).

The values for the chosen and opposite pack pressures 78 and 80, and the converter speed values 74 used for braking the vehicle can vary depending on the size of the vehicle, the load carried by the vehicle, or other physical parameters, such as the type of tires used on the vehicle. For example, for a relatively light load, less clutch pack pressure in both packs may be required to slow down the vehicle at a particular rate On the other hand, the CPU 40 can select larger clutch pack pressures 78 and 80 for a larger vehicle or a vehicle with a larger load.

Thus, the clutch pack pressures 78 and 80 in FIGS. 2 and 4 can be varied to maintain a relatively constant deceleration rate 70 for different vehicle operating parameters. The CPU 40 can automatically vary the clutch pack pressures according to the monitored deceleration rate of the vehicle. The CPU 40 varies the clutch pack pressures to maintain a relatively constant deceleration rate regardless of varying vehicle conditions.

The clutch pack pressures can also be predefined and stored in memory. The CPU then uses the parameters associated with the particular vehicle condition. For example, the CPU could use a particular set of pressure parameters associated with a load weight detected by a weight sensor (not shown).

Either technique allows a vehicle operator to use the same accelerator pedal positions to perform the same relative stopping and power reversal rates independently of the type of vehicle or load on the vehicle.

The one speed PS transmission shown in FIG. 1B, the two speed PS transmissions shown in FIG. 1C, or three or more speed PS transmissions, can use the same control schemes described above for sharing energy dissipation between packs. Alterations may be necessary to the pressure maps and the turbine speed maps. For multi-speed transmissions, combinations of forward gears can be used to brake in a manner similar to applying forward and reverse packs using the same basic technique used in the single speed transmission.

Pushing and Pulling During High Draw Bar Pull Conditions

The transmission system also has the ability to more efficiently push and pull loads (barging). The result is reduced heat generation during vehicle pushing and pulling, lower fuel consumption, and the ability to push and pull loads further than a conventional powershift transmission while at the same time avoiding overheating.

Referring to FIGS. 1C and 6, draw bar performance curve 182 shows the speed vs. Draw Bar Pull (DBP) relationship for the vehicle 10 when the first set of forward gears 21 are engaged in transmission 14 in the forward direction. The DBP is essentially the amount of pushing or pulling capability of the vehicle. A draw bar performance curve 180 shows the speed vs. DBP for the vehicle 10 when the second set of higher gears 19 engaged in the transmission 14. Curve 184 represents the vehicle engine speed.

Vertical line 190 in one example represents a speed of approximately 3 mph and vertical line 192 represents a speed of approximately 5 mph. The two lines 190 and 192 are examples and the actual speeds may vary for different transmission systems.

When the transmission engages a forward gear 19 (high) represented by draw bar pull performance curve 180, the vehicle slows down as it approaches the torque limit DBP 1. As the vehicle approaches torque limit DBP1, much of the power exerted by the engine is converted into heat in the torque converter 15. The torque limit DBP1 may occur, for example, when the vehicle is pushing or pulling a heavy load up a steep grade. This additional energy is wasted and may damage the transmission system.

The low gear draw bar pull performance curve 182 is provided by switching to the second forward gear 21 (low) shown in FIG. 1C. The low gear 21 can exert a higher DBP at lower speeds but eventually reaches a torque limit DBP2. Similarly, as the engine approaches torque limit DBP2, much of the energy generated by the engine is converted into heat in the torque converter 15.

About the same DBP curve 180 can be provided using substantially less energy. In the multi-speed transmission shown in FIG. 1C, this is done by using the low gear 21 in transmission 15 in combination with limiting engine speed. Line 186 represents the reduced engine speed used during high DBP conditions for vehicle speeds less than value 190. By switching to the lower gear represented by curve 182 and at the same time limiting the engine speed as shown by line 186, the vehicle provides the draw bar pull performance curve 188 at low speeds. The draw bar pull performance curve 188 is substantially the same as the single gear power curve 180 but uses substantially less energy.

FIG. 7 shows in more detail how the vehicle is controlled during high torque conditions. For example, when moving a load up a steep grade. In block 160 the vehicle operator chooses to push or pull an object with full power. The CPU in block 162 checks the travel direction of the vehicle. In one example, the vehicle should be moving in a forward direction. However, in other applications, the vehicle could be moving in a reverse direction.

If the vehicle is traveling above some predetermined speed, the CPU 40 jumps back to block 160. In this example, the predetermined speed is around 3 mph. If the vehicle speed is less than 3 mph, the transmission switches to the lower gearing 21 (or it may already be in low) shown in FIG. 1C and the CPU 40 goes into an engine control mode. Engaging the additional lower transmission gear 21 lowers the heat load during pushing or pulling. The CPU activates the second gear via fwd-2 signal 26 in FIG. 1A.

The CPU checks the torque converter slip speed and the transmission temperature in block 166. The torque converter slip speed is the speed difference between the input shaft 13 and the output shaft 17 in FIG. 1C. Either the slip speed or the transmission temperature indicate the amount of energy exhausted in the torque converter 15.

If the converter slip speed is greater than some predetermined rpm value (z) or if the transmission temperature is greater than some predetermined value (y), the CPU reduces the engine speed in block 170. This is represented by line 186 in FIG. 6. If the torque converter slip speed is less than the predetermined rpm value (z) and the transmission fluid temperature is less than the predetermined temperature (y), the torque converter exits the energy control mode and jumps back to block 160.

The CPU in block 170 controls the engine speed via the electronic governor control signal 32 (FIG. 1A) until the torque converter slip speed is equal to a predetermined mapped rpm value. In block 172, the mapped speed rpm value may be adjusted according to the measured transmission fluid temperature. The engine speed is modulated in block 174 to hold the torque converter slip-speed (rpm) below a predetermined value. This limits the engine DBP as represented by line 188 in FIG. 6.

Alternatively, the engine speed setting can be limited according to the vehicle speed. Both control schemes will produce the relatively constant vehicle draw bar pull performance value 188 in FIG. 6.

The heat in the oil cooling circuit of the converter 15 is further reduced by increasing cooling system capacity referred to in block 176. This can be done using an oil-to-air radiator similar to the type used in hydrostatic transmissions. By reducing the heat horsepower generated in the torque converter 15, the CPU increases the pushing or pulling capability of the engine 12. The CPU 40 in block 178 then waits for further driver pushing or pulling commands.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles.

What is claimed is:

1. A method for controlling speed of a vehicle, comprising:
   slipping a first clutch while the vehicle engine is operating at a reduced engine speed for decelerating the vehicle; and
   slipping a second clutch at the same time the first clutch is being slipped, the second clutch applying a slipping force corresponding to a current direction of vehicle travel and opposite to a slipping force applied by the first clutch, the slipping force of the second clutch maintaining a torque converter at an approximately constant low speed.

2. A method according to claim 1 including initially increasing a pressure to the first clutch and then maintaining the pressure at a substantially constant value when the torque converter reaches the low speed.

3. A method according to claim 1 including initially reducing pressure in the second clutch then automatically increasing and decreasing the pressure to maintain the torque converter at the low speed.

4. A method according to claim 3 including varying the pressure of the second clutch according to a monitored output speed of the torque converter.

5. A method according to claim 3 including applying pressures to the first and second clutches according to predetermined mapped values.

6. A method according to claim 1 including progressively reducing the pressure in the second clutch to zero when the vehicle speed approximately reaches the reduced torque converter speed.

7. A method according to claim 1 wherein the first clutch is associated with a direction opposite to a direction of vehicle travel and the second clutch is associated with a same direction of vehicle travel when the braking condition is initially detected.

8. A method according to claim 1 including identifying a power reversal mode.

9. A method according to claim 8 including automatically reducing the engine speed to idle when the power reversal mode is identified.

10. A method for controlling speed of a vehicle, comprising:
   detecting a braking condition;
   slipping a first clutch during the braking condition while the vehicle engine is operating at a reduced engine speed;
   slipping a second clutch during the braking condition to maintain a torque converter at an approximately constant low speed;
   identifying a power reversal mode for the braking condition;
   progressively reducing pressure in the second clutch down to about zero after the vehicle speed approaches zero;
   progressively increasing pressure in the first clutch after the vehicle speed reaches approximately zero; and
   progressively increasing the engine speed after the vehicle speed reaches approximately zero.

11. A method according to claim 1 including identifying an accelerator braking mode for the braking condition by monitoring an accelerator position setting, a vehicle speed, and direction sensor.

12. A method for controlling speed of a vehicle, comprising:
   detecting a braking condition;
   slipping a first clutch during the braking condition while the vehicle engine is operating at a reduced engine speed;
   slipping a second clutch during the braking condition to maintain a torque converter at an approximately constant low speed;
   identifying an accelerator braking mode for the braking condition by monitoring an accelerator position setting, a vehicle speed, and direction sensor;
   progressively reducing pressure in the second clutch down to a low level as the vehicle speed approaches zero;
   increasing pressure in the second clutch after the vehicle speed approximately reaches zero while maintaining a constant pressure in the first clutch; and
   maintaining a constant idle speed for the engine after the vehicle speed approximately reaches zero.

13. A method for controlling a vehicle, comprising:
   detecting a low energy efficiency condition in the vehicle;
   changing or maintaining the vehicle in a low gear; and
   automatically reducing engine speed in the vehicle in combination with operating the vehicle in the low gear when the low energy efficiency condition is detected to automatically maintain an approximately constant vehicle torque below a maximum torque value provided by the low gear.

14. A method according to claim 13 wherein the low energy efficiency condition comprises either a torque converter temperature above a predefined value or a torque converter slip speed above a predefined value.

15. A method according to claim 13 including automatically increasing and decreasing the engine speed to hold an output speed of the torque converter at the approximate constant vehicle torque specified by predetermined values during the low energy efficiency condition.

16. A method according to claim 13 including maintaining the approximately constant vehicle torque at approximately a peak torque value provided by a second higher gear.

17. A method according to claim 13 including identifying the low energy efficiency condition when the vehicle is traveling below a predetermined speed.

18. A method according to claim 13 including progressively reducing the engine speed corresponding with reduction of the vehicle speed when the vehicle speed drops below a predetermined value.

19. A method according to claim 13 including automatically activating the low gear when the low efficiency condition is detected and then limiting the engine speed so that the vehicle only has approximately the torque available for a higher gear.

20. A braking system, comprising:
   a first clutch pack associated with a first direction of vehicle travel;
   a second clutch pack associated with a second direction of vehicle travel; and
   a processor activating both the first clutch pack and the second clutch pack at the same time to distribute braking energy between the first clutch pack and the second clutch pack during clutch pack braking.

21. A braking system according to claim 20 wherein the first clutch pack and the second clutch pack are associated with opposite directions of vehicle travel.

22. A braking system according to claim 20 including a torque converter speed sensor used by the processor to maintain a substantially constant low torque converter speed during clutch pack braking.

23. A braking system according to claim 20 including an accelerator sensor, the processor applying pressure to the first and second clutch packs according to the accelerator sensor.

24. A braking system according to claim 23 wherein the processor automatically initiates clutch pack braking when the accelerator sensor indicates an accelerator pedal has moved past an idle position.

25. A braking system according to claim 20 including a direction sensor used for initiating clutch pack braking during a power reversal.

26. A braking system according to claim 20 including a memory storing predetermined clutch pack pressure parameters used by the processor to activate the first and second clutch packs.

27. A braking system according to claim 26 wherein the processor selects the clutch pack pressure parameters according to a detected accelerator value.

28. A braking system according to claim 20 including torque converter slip sensors and a torque converter or transmission temperature sensor, the processor reducing engine speed when the torque converter slip sensors indicate a torque converter slip speed above a predefined value or when the torque converter or transmission temperature sensor indicates a temperature above a predefined value.

29. A braking system according to claim 28 including a low gear clutch pack activated by the processor before reducing the engine speed.

30. A braking system according to claim 20 including a third clutch pack associated with the same direction of vehicle travel as the first clutch pack, the processor using both the first, second and third clutch pack to brake the vehicle at high speeds and the processor using the first and second clutch packs to brake the vehicle at low speeds.

31. A method for controlling speed of a vehicle, comprising:
   progressively reducing pressure in a first clutch down to a low level as the vehicle speed approaches zero;
   increasing pressure in the first clutch after the vehicle speed approximately reaches zero while maintaining a constant pressure in a second clutch; and
   maintaining a constant idle speed for a vehicle engine after the vehicle speed approximately reaches zero.

32. A method according to claim 31 including:
   reducing pressure in the first clutch after the vehicle speed approximately reaches zero;
   progressively increasing pressure in the second clutch after the vehicle speed reaches approximately zero; and
   progressively increasing the vehicle engine speed after the vehicle speed reaches approximately zero.

33. A method according to claim 31 including initially reducing pressure in the first clutch then automatically increasing and decreasing the pressure to maintain a torque converter at the low speed.

34. A method according to claim 33 including varying the pressure of the first clutch according to a monitored output speed of the torque converter.

35. A method according to claim 33 including applying pressures to the first and second clutches according to predetermined mapped values.

36. A method according to claim 31 wherein the first clutch and the second clutch are associated with opposite directions of vehicle travel.

37. A method according to claim 31 including initially increasing a pressure to the second clutch and then maintaining the pressure at a substantially constant value when a torque converter reaches a low speed.

38. A braking system, comprising:
   a first clutch pack associated with a first direction of vehicle travel;
   a second clutch pack associated with a second opposite direction of vehicle travel; and
   a processor progressively reducing pressure in the first clutch pack down to a low level as vehicle speed approaches zero and increasing pressure in the first clutch pack after the vehicle speed approximately reaches zero while maintaining a constant pressure in the second clutch pack, the processor maintaining a constant idle speed for the engine after the vehicle speed approximately reaches zero.

39. A braking system according to claim 38 including a torque converter speed sensor used by the processor to maintain a substantially constant low torque converter speed during clutch pack braking.

40. A braking system according to claim 38 including an accelerator sensor, the processor applying pressure to the first and second clutch packs according to the accelerator sensor.

41. A braking system according to claim 40 wherein the processor automatically initiates clutch pack braking when the accelerator sensor indicates an accelerator pedal has moved past an idle position.

42. A braking system according to claim 38 including a direction sensor used for initiating clutch pack braking during a power reversal.

43. A braking system according to claim 38 including torque converter slip sensors and a torque converter or transmission temperature sensor, the processor reducing engine speed when the torque converter slip sensors indicate a torque converter slip speed above a predefined value or when the torque converter or transmission temperature sensor indicates a temperature above a predefined value.

44. A braking system according to claim 38 including a low gear clutch pack activated by the processor before reducing the engine speed.

45. A braking system according to claim 38 including a third clutch pack associated with the same direction of vehicle travel as the second clutch pack, the processor using both the first, second and third clutch pack to brake the vehicle at high speeds and the processor using the first and second clutch packs to brake the vehicle at low speeds.

* * * * *